United States Patent
Xiao et al.

(10) Patent No.: US 8,281,246 B2
(45) Date of Patent: Oct. 2, 2012

(54) TRAVELOGUE-BASED CONTEXTUAL MAP GENERATION

(75) Inventors: Rong Xiao, Beijing (CN); Jiangming Yang, Beijing (CN); Lei Zhang, Beijing (CN); Xingrong Chen, Macau (CN)

(73) Assignee: Microsoft Corporation, Redmond, WA (US)

( * ) Notice: Subject to any disclaimer, the term of this patent is extended or adjusted under 35 U.S.C. 154(b) by 277 days.

(21) Appl. No.: 12/568,735

(22) Filed: Sep. 29, 2009

(65) Prior Publication Data

US 2011/0078575 A1    Mar. 31, 2011

(51) Int. Cl.
G06F 3/00 (2006.01)
G06F 17/00 (2006.01)
G06F 7/00 (2006.01)

(52) U.S. Cl. .................. 715/738; 715/231; 707/776

(58) Field of Classification Search .................. 715/231, 715/230, 738; 707/776
See application file for complete search history.

(56) References Cited

U.S. PATENT DOCUMENTS

| | | | |
|---|---|---|---|
| 6,182,008 B1 | 1/2001 | Nikiel et al. | |
| 6,321,158 B1 | 11/2001 | DeLorme et al. | |
| 7,379,811 B2 | 5/2008 | Rasmussen et al. | |
| 7,463,976 B2 | 12/2008 | Nomura | |
| 7,472,338 B2 * | 12/2008 | Carro | 715/205 |
| 7,475,010 B2 | 1/2009 | Chao | |
| 7,548,915 B2 | 6/2009 | Ramer et al. | |
| 7,698,332 B2 | 4/2010 | Liu et al. | |
| 7,734,641 B2 * | 6/2010 | Kanigsberg et al. | 707/765 |
| 7,788,134 B1 * | 8/2010 | Manber et al. | 705/26.1 |
| 8,095,303 B1 | 1/2012 | Nesbitt et al. | |
| 2002/0128767 A1 | 9/2002 | Cardno et al. | |
| 2002/0143490 A1 | 10/2002 | Maeda et al. | |
| 2003/0093217 A1 | 5/2003 | Petzold et al. | |
| 2004/0059708 A1 | 3/2004 | Dean et al. | |
| 2005/0216464 A1 | 9/2005 | Toyama et al. | |
| 2005/0234991 A1 * | 10/2005 | Marx et al. | 707/104.1 |
| 2005/0278378 A1 * | 12/2005 | Frank | 707/104.1 |
| 2006/0047690 A1 | 3/2006 | Humphreys et al. | |
| 2006/0230033 A1 | 10/2006 | Halevy et al. | |
| 2007/0005419 A1 | 1/2007 | Horvitz et al. | |
| 2007/0010942 A1 | 1/2007 | Bill | |
| 2007/0150188 A1 | 6/2007 | Rosenberg | |
| 2007/0179863 A1 | 8/2007 | Stoll | |

(Continued)

OTHER PUBLICATIONS

Overell et al., Geographic Co-occurrence as a Tool for GIR, ACM, Nov. 9, 2007.*

(Continued)

*Primary Examiner* — Tadeese Hailu
*Assistant Examiner* — Nicholas Ulrich
(74) *Attorney, Agent, or Firm* — Hope Baldauff Hartman, LLC (57) ABSTRACT

A map user interface control provides functionality for displaying a map in conjunction with the display of a Web page. The map control operates in combination with a location extraction component that analyzes the contents of the Web page to identify locations mentioned therein. Once the location extraction component has identified the locations mentioned in the Web page, a map is generated that encompasses the locations identified in the Web page. Once the map has been generated, the map control displays the map in conjunction with the display of the Web page. The map might include visual indicators corresponding to the locations mentioned in the Web page. The map might also include visual indicators corresponding to other locations near the locations identified in the Web page that have been identified using co-occurrence values generated through an analysis of a set of travelogues.

18 Claims, 7 Drawing Sheets

U.S. PATENT DOCUMENTS

| | | | |
|---|---|---|---|
| 2007/0198182 A1 | 8/2007 | Singh | |
| 2007/0219968 A1* | 9/2007 | Frank | 707/3 |
| 2008/0010605 A1* | 1/2008 | Frank | 715/765 |
| 2008/0033903 A1 | 2/2008 | Carol et al. | |
| 2008/0082578 A1* | 4/2008 | Hogue et al. | 707/104.1 |
| 2008/0086468 A1 | 4/2008 | Jing et al. | |
| 2008/0086686 A1 | 4/2008 | Jing et al. | |
| 2008/0125969 A1 | 5/2008 | Chen et al. | |
| 2008/0319974 A1 | 12/2008 | Ma et al. | |
| 2009/0005981 A1 | 1/2009 | Forstall et al. | |
| 2009/0019066 A1 | 1/2009 | Wang et al. | |
| 2009/0070297 A1* | 3/2009 | Hadzima et al. | 707/3 |
| 2009/0119255 A1 | 5/2009 | Frank et al. | |
| 2009/0156229 A1* | 6/2009 | Hein et al. | 455/456.1 |
| 2010/0179754 A1* | 7/2010 | Faenger et al. | 701/208 |
| 2011/0072025 A1* | 3/2011 | van Zwol et al. | 707/750 |
| 2011/0077848 A1 | 3/2011 | Xiao et al. | |
| 2011/0078139 A1 | 3/2011 | Xiao et al. | |
| 2011/0252025 A1 | 10/2011 | Jin et al. | |
| 2011/0264655 A1 | 10/2011 | Xiao et al. | |
| 2011/0264664 A1 | 10/2011 | Xiao et al. | |
| 2011/0271232 A1 | 11/2011 | Crochet et al. | |

OTHER PUBLICATIONS

"Inserting HTML Code into your Web Site—Published Date: 2009",Retrieved at <<http://office.microsoft.com/en-us/officelive/FX102223081033.aspx?mode=print>>, Aug. 11, 2009, pp. 6.

"Embed Google Maps on your Website or Blog—Published Date: Sep. 5, 2007",Retrieved at <<http://www.labnol.org/internet/blogging/embed-google-maps-on-your-website-or-blog/1316/>>,Sep. 5, 2007, p. 1.

"Web User Experience—Published Date: 2009",Retrieved at <<http://research.microsoft.com/en-us/projects/wue/>>, Aug. 11, 2009, pp. 2.

"Microsoft Streets & Trips 2001 Planning a Road Trip—Published Date: 2001",Retrieved at <<http://www.webjunction.org/c/document_library/get_file?folderId=431408&name=DLFE-10121.pdf>>, Year 2001, Lesson 16 , pp. 147-154.

"GeoSense Mobility Complete Mobile Workforce Management Platform—Published Date: 2009",Retrieved at <<http://enovia.ca/site/GeoSenseMobility.php>>, Aug. 11, 2009, pp. 3.

"Yahoo! Placemaker™ Beta",Retrieved at <<http://developer.yahoo.com/geo/placemaker/>>, Year 2009, pp. 2.

Amitay , et al. ,"Web-a-Where: Geotagging Web Content", Retrieved at <<http://einat.webir.org/SIGIR_2004_GeoMiner_p273-amitay.pdf>>, 2004, pp. 273-280.

"Bootsnall",Retrieved at <<http://www.bootsnall.com>>, Aug. 7, 2009, pp. 2.

"Expedia",Retrieved at <<http://www.expedia.com>>, Aug. 7, 2009, pp. 2.

"Getjealous",Retrieved at <<http://www.getjealous.com>>, Aug. 7, 2009, pp. 2.

Leidner , et al.,"Grounding Spatial Named Entities for Information Extraction and Question Answering",Retrieved at <<http://citeseerx.ist.psu.edu/viewdoc/download?doi=10.1.1.4.3786&rep=rep1&type=pdf>>, Scotland UK, Year 2003, pp. 31-38.

Li , et al. ,"Location Normalization for Information Extraction",Retrieved at <<http://www.aclweb.org/anthology/C/C02/C02-1127.pdf>>, Year 2002, vol. 1, pp. 1-7.

Li , et al.,"Infoxtract Location Normalization: A Hybrid Approach to Geographic References in Information Extraction", Retrieved at <<http://acl.ldc.upenn.edu/W/W03/W03-0106.pdf>>,2002,vol. 1,pp. 1-7.

Ma ,et al., "A Localness-Filter for Searched Web Pages",Retrieved at <<http://www.springerlink.com/content/pkm5r1yv1jd2hw7m/fulltext.pdf>>,Copyright 2003, vol. 2642/2003, pp. 525-536.

Mc Curley , Kevin ,"Geospatial Mapping and Navigation of the Web",Retrieved at <<http://delivery.acm.org/10.1145/380000/372056/p221-mccurley.pdf?key1=372056&key2=2726369421&coll=GUIDE&dl=GUIDE&CFID=46700166&CFTOKEN=58855283>>,May 1-5, 2001, Hong Kong, pp. 221-229.

Rauch ,Erik ,"A Confidence-Based Framework for Disambiguating Geographic Terms",Retrieved at <<http://delivery.acm.org/10.1145/1120000/1119402/p50-rauch.pdf?key1=1119402&key2=9416369421&coll=GUIDE&dl=GUIDE&CFID=46700009&CFTOKEN=96529354>>,Year 2003, vol. 1, pp. 50-54.

"Realtravel",Retrieved at <<http://www.realtravel.com>>, Aug. 7, 2009, pp. 3.

"Travelblog",Retrieved at <<http://www.travelblog.org>>, Aug. 7, 2009, pp. 4.

"Traveljournals",Retrieved at <<http://www.traveljournals.net>>, Aug. 7, 2009, pp. 4.

"Travelpod",Retrieved at <<http://www.travelpod.com>>, Aug. 7, 2009, pp. 4.

"Travelpost",Retrieved at <<http://www.travelpost.com>>, Aug. 7, 2009, pp. 1.

Wang ,et al.,"Detecting Geographic Locations from Web Resources",Retrieved at <<http://delivery.acm.org/10.1145/1100000/1096991/p17-wang.pdf?key1=1096991&key2=5065369421&coll=GUIDE&dl=GUIDE&CFID=47917983&CFTOKEN=38473394>>,Year 2005, pp. 17-24.

Wang ,et al.,"Web Resource Geographic Location Classification and Detection",Retrieved at <<http://www2005.org/cdrom/docs/p1138.pdf>>,Year 2005, pp. 1138-1139.

"Geographic Information System," Wikipedia, Retrieved Aug. 6, 2009 from http://en.wikipedia.org/wiki/GIS, 18 pages.

"Road Trip," Retrieved Aug. 6, 2009 from http://download.microsoft.com/download/2/4/b/24bb8c05-8bd4-4cac-89ff-0901bf3b8468/RoadTrip.doc, 1 Page.

"Shortest Path Problem," Wikipedia, Retrieved Aug. 7, 2009 from http://en.wikipedia.org/wiki/Shortest_path, 4 pages.

"Travelling Salesman Problem," Wikipedia, Retrieved Aug. 7, 2009 from http://en.wikipedia.org/wiki/Traveling_salesman_problem, 8 pages.

Brunato et al., "A Location-dependent Recommender System for the Web," 2002, Technical Report DIT-02-093, *Ingengneria e Scienca dell'Informazione*, University of Trento, Italy, 5 pages.

Cucerzan, "Large-scale Named Entity Disambiguation Based on Wikipedia Data," Jun. 2007, *Proceedings of the 2007 Joint Conf. on Empirical Methods in Natural Language Processing and Computational Natural Language Learning*, pp. 708-716.

Ardissono et al. "Tailoring the Recommendation of Tourist Information to Heterogeneous user Groups," 2002, *Proceedings, Revised Papers from the International Workshops OHS-7, SC-3, and AH-3 on Hypermedia: Openness, Structural Awareness, and Adaptivity*, pp. 280-295.

Hassell, IV "Ontology-driven Automatic Entity Disambiguation in Unstructured Text," 2006, Thesis, University of Georgia, 96 pages.

Martens, "On Usability of Web Services," Dec. 13, 2003, *Proceedings of 4th Int'l Conference on Web Information Systems Engineering Workshops*, pp. 182-190.

Mior, "Rapid Prototyping of a Mobile Location-based Tour," Dec. 12, 2008, Thesis, University of Ontario Institute of Technology, 22 pages.

Park et al., "Location-based Recommendation System Using Bayesian User's Preference Model in Mobile Devices," 2007, *Lecture Notes in Computer Science*, vol. 4611/2007, pp. 1130-1139.

Pouliquen et al., "Geographical Recognition and Visualization in Texts Written in Various Languages," Mar. 14-17, 2004, *ACM Symposium on Applied Computing*, 8 pages.

Ricci, "Travel Recommender Systems," Nov./Dec. 2002, *IEEE Intelligent Systems*, 17(6): 55-57.

Rogers, et al., "An Adaptive Interactive Agent for Route Advice," 1999, *Proceedings of the third annual conference on Autonomous Agents*, pp. 198-205.

Silvia et al., "Adding Geographic Scopes to Web Resources," 2004, *Workshop on Geographic Information Retrieval*, Sheffield, UK, 3 pages.

Sundheim, "Resources to Facilitate Progress in Place Name Identification and Reference Resolution," 2002, *Proceedings of the 2nd Int'l Conference on Human Language Technology Research*, pp. 319-324.

Takeuchi et al., "An Outdoor Recommendation System based on User Location History," 2005, ubiPCMM, 10 pages.

Wang et al., "Application-Driven Web Resource Location Classification and Detection," Mar. 2005, retrieved from http://research.microsoft.com/pubs/70152/tr-2005-32.pdf, 10 pages.

Wang et al., "Detecting Dominant Locations from Search Queries," 2005, *Proceedings of SIGR Conference on Research and Development in Information Retrieval*, pp. 424-431.

Zheng et al., "Mining Interesting Locations and Travel Sequences from GPS Trajectories," Apr. 20-24, 2009, *Proceedings of the 18th Int'l Conference on World Wide Web*, Madrid, Spain, pp. 791-800.

"Travelogue," Retrieved Aug. 6, 2009 from http://sourceforge.net/projects/travelogue/, 1 page.

U.S. Official Action dated Feb. 29, 2012 in U.S. Appl. No. 12/764,989.

U.S. Notice of Allowance dated May 23, 2012 in U.S. Appl. No. 12/568,725.

U.S. Official Action dated Mar. 26, 2012 in U.S. Appl. No. 12/568,749.

U.S. Official Action dated Mar. 30, 2012 in U.S. Appl. No. 12/764,977.

Free Geography Tools, Jul. 19, 2007, pp. 1-10.

Jing et al., "VirtualTour: An Online Travel Assistant Based on High Quality Images," Oct. 23-27, 2006, MM'06, SantaBarara, California, 4 pages.

\* cited by examiner

TRAVELOGUE-BASED CONTEXTUAL MAP GENERATION

BACKGROUND

When searching the World Wide Web (the "Web") for travel information, it is not uncommon for users to utilize multiple Web sites to locate sought-after information. For instance, it is not uncommon for a user to utilize a search engine to identify a Web site that contains interesting travel information for a location. After viewing the identified Web site, it is also not uncommon for the user to then navigate to a map Web site in order to view a map of the location. Navigation between multiple Web sites in this manner can be a frustrating and time consuming experience for users interested in quickly and easily locating travel information about a location along with a map of the location. It can also be difficult for users to locate information regarding other interesting sites near the location.

It is with respect to these and other considerations that the disclosure made herein is presented.

SUMMARY

Concepts and technologies are disclosed herein for travelogue-based contextual map generation. Through an implementation of the concepts and technologies presented herein, locations mentioned within a Web page can be identified. A map can then be displayed in conjunction with a display of the Web page that encompasses the locations mentioned in the Web page. The displayed map can be displayed without any user intervention. In this way, a user can be presented with a map configured to the contextual content of a Web page without requiring the user to navigate away from the Web page to a site that provides maps.

According to one aspect, a map user interface control ("map control") is provided herein. The map control provides functionality for displaying a map in conjunction with the display of a Web page, such as within a Web browser application program. In various embodiments, program code may be embedded within a Web page that causes the map control to be instantiated when the Web page is rendered by the Web browser application program.

In various embodiments, the map control operates in conjunction with a location extraction component that analyzes the contents of the Web page to identify locations mentioned therein. The location extraction component might utilize a gazetteer containing location names in order to identify locations mentioned in the Website. For instance, a gazetteer might be utilized to identify possible name candidates, a classifier might then be utilized to identify location names from the name candidates, and ambiguity resolution might then be performed to distinguish between different locations having the same name.

Once the location extraction component has identified the locations mentioned in the Web page, a map is generated that encompasses the locations identified in the Web page. A map server might be utilized in embodiments to generate the map. Once the map has been generated, the map control displays the map in conjunction with the display of the Web page. For instance, if the Web page includes text, the map control might display the map in conjunction with the display of the text of the Web page. The names of the locations in the text might also be emphasized.

According to various embodiments, the map includes visual indicators corresponding to the locations identified in the Web page. According to yet other embodiments, the map might also include visual indicators corresponding to other locations near the locations identified in the Web page. To provide this functionality, a co-occurrence extraction component generates co-occurrence values for a set of travelogues. Each co-occurrence value is an integer value that specifies the number of times two locations are mentioned in the same travelogue for the entire set of travelogues. Travelogues are textual descriptions of a person's experience with a particular location. For instance, a person might travel to New York City and write a travelogue that describes their travel experience. In addition to a description of the person's travel experience with a particular location, a travelogue might also include a description of the person's experience with other, related locations.

Once the co-occurrence values have been generated, these values can be utilized to identify other locations near the locations mentioned in the Web page. In particular, the co-occurrence values are searched in order to identify those other locations that have non-zero co-occurrence values with respect to the locations identified in the Web page. The other locations having non-zero co-occurrence values with respect to the specified location can then be displayed on the map. In one embodiment, only those other locations having the highest co-occurrence values with respect to the locations identified in the Web page may be displayed.

It should be appreciated that the above-described subject matter might also be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for travelogue-based contextual map generation. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements throughout the several figures, aspects of a computing system, computer-readable storage medium, and computer-implemented methodology for travelogue-based contextual map generation will be presented.

Figure 1:
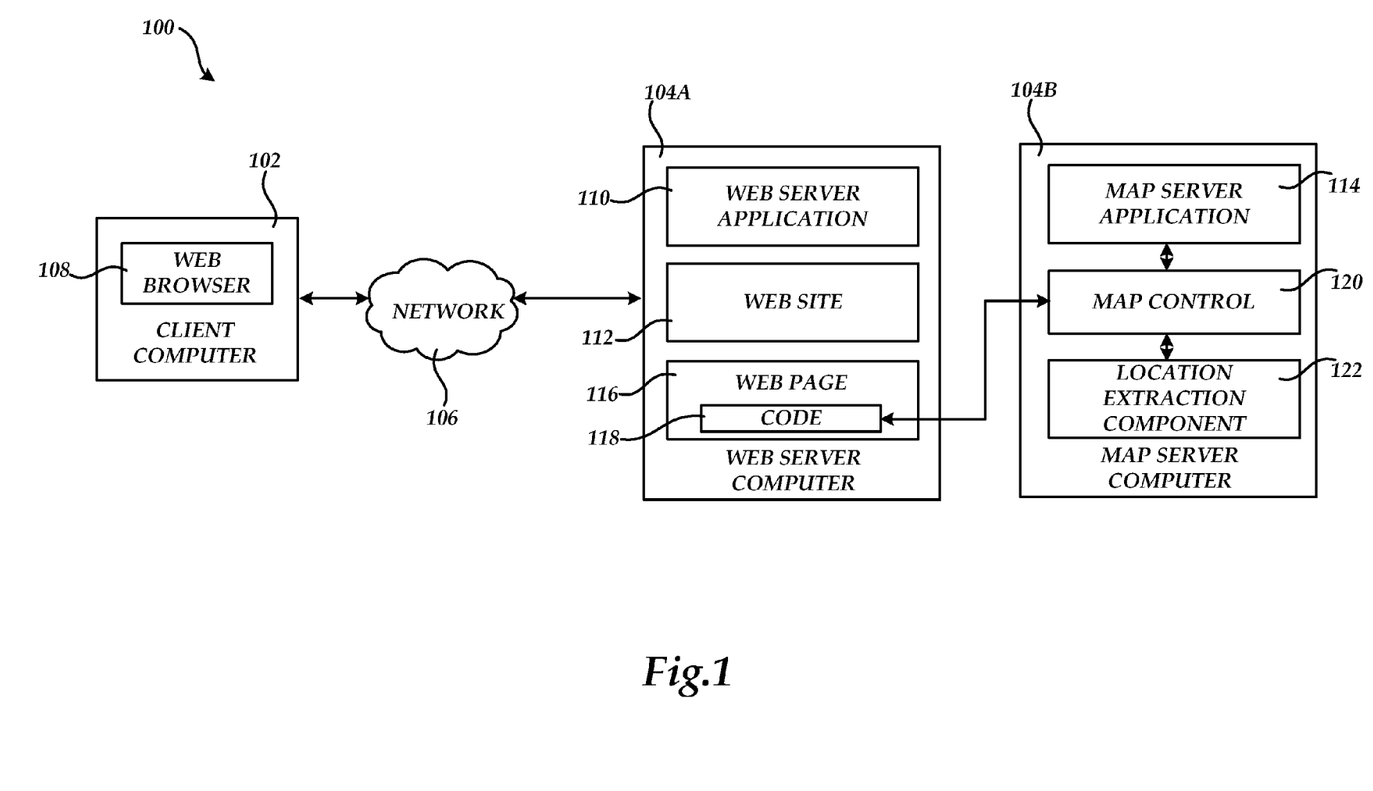
FIG. 1 is a system diagram illustrating aspects of one operating environment for the various embodiments presented herein and several software components presented herein.

Referring now to FIG. 1, aspects of one operating environment for the various embodiments presented herein will be described. The operating environment shown in FIG. 1 includes a system 100 having a client computer 102 and several server computers 104A-104B therein that are communicatively coupled via a network 106. In the embodiments presented herein, the network 106 comprises the Internet. It should be appreciated, however, that other types of local and wide area networks may be utilized to interconnect the client computer 102 and the server computers 104A-104B.

It should also be appreciated that although a single client computer 102 and two server computers 104A-104B have been illustrated in FIG. 1, many such client computers 102 may be utilized in conjunction with the functionality presented herein and many server computers 104A-104B may be utilized to provide the functionality described herein. In this regard, it should be appreciated that some of the software components described herein for providing travelogue-based contextual map generation may be executed in a distributed fashion among many such server computers 104 interconnected by many such networks 106.

According to one implementation, the server computer 104A is configured to execute a Web server application 110. As known in the art, a Web server application 110 is configured to receive and respond to requests for Web sites, such as the Web site 112. As also known in the art, a Web site 112 is a collection of Web pages, like the Web page 116, and related content such as graphics, audio, and multimedia files. A user of the client computer 102 may utilize the Web browser 108 to establish a connection with the Web server application 110 and to view and interact with the Web site 112.

According to one implementation, the Web site 112 includes a Web page 116 that has program code 118 embedded therein. As will be described in greater detail below, the program code 118 causes a map control 120 stored at the map server computer 104B to be embedded within the Web page 116 when rendered by the Web browser 108. According to embodiments, the program code 118, which may be referred to herein simply as code 118, may comprise script or other types of program code that may be embedded within a Web page 116.

As will be discussed in greater detail below, the map control 120 executes in conjunction with a location extraction component 122. The location extraction component 122 is configured to identify the names of locations mentioned in the Web page 116. Once the location extraction component 122 has identified the names of the locations mentioned in the Web page 116, the map control 120 is configured to retrieve a map encompassing the identified locations from the map server application 114. As known in the art, the map server application 114 comprises an executable program component for generating maps.

Once the appropriate map has been generated, the map control 120 executes within the Web browser 118 and causes the generated map to be displayed in-line with the rendering of the Web page 116. As will also be described in greater detail below, the map might include visual indicators corresponding to the locations identified in the Web page 116. Additionally, the map might also include visual indicators corresponding to other popular locations near the locations identified in the Web page 116. To provide this functionality, the map control 120 also operates in conjunction with a co-occurrence extraction component that generates co-occurrence values. The co-occurrence values can then be utilized to identify other locations near the locations mentioned in the Web page 116. Additional details regarding the operation of the location extraction component 122 will be described below with respect to FIG. 2. Additional details regarding the operation of the co-occurrence extraction component 302 will be described below with reference to FIG. 3.

Figure 2:
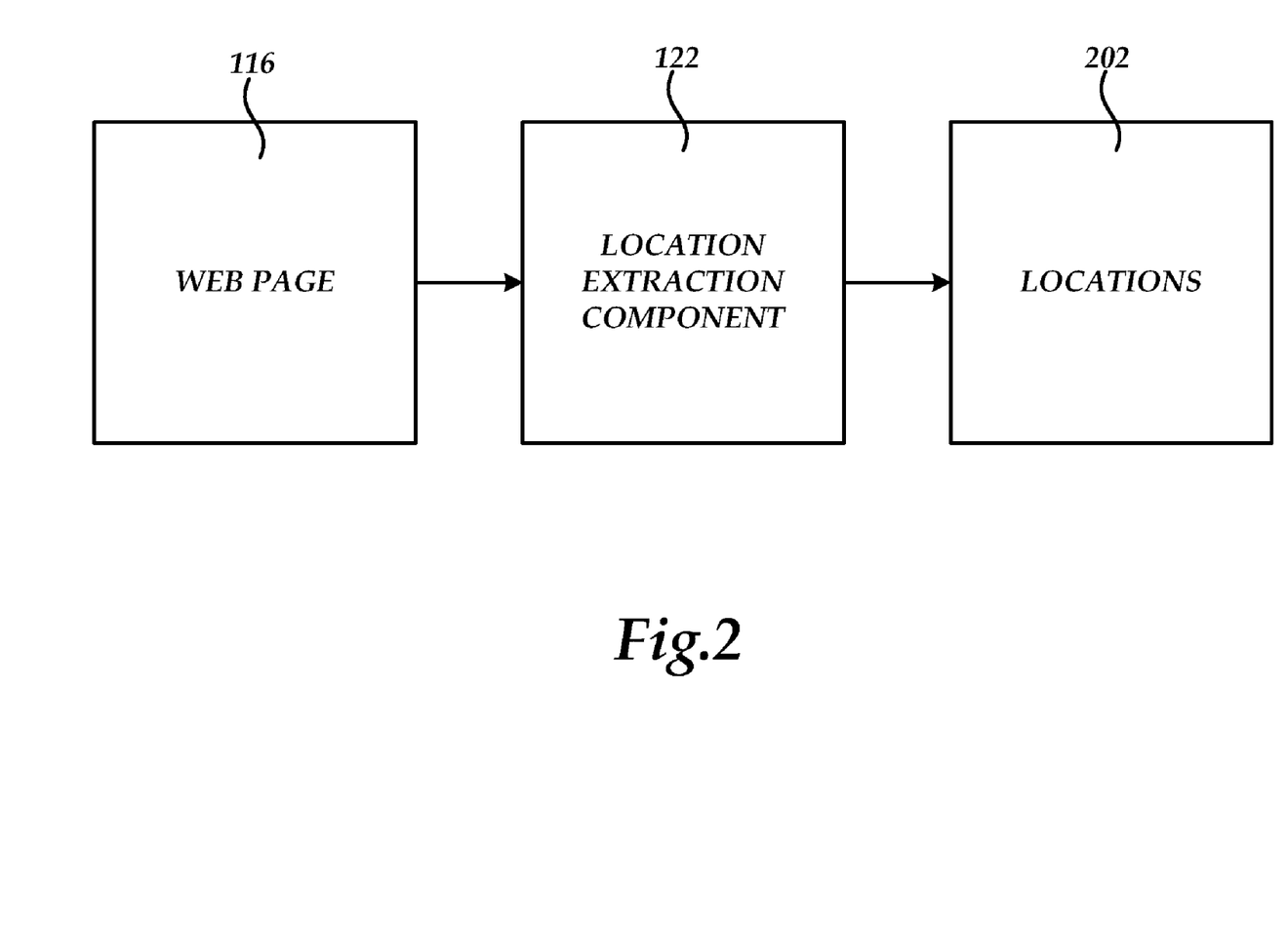
FIG. 2 is a software architecture diagram showing aspects of a software component utilized in one embodiment presented herein for extracting locations from a Web site.
Figure 3:
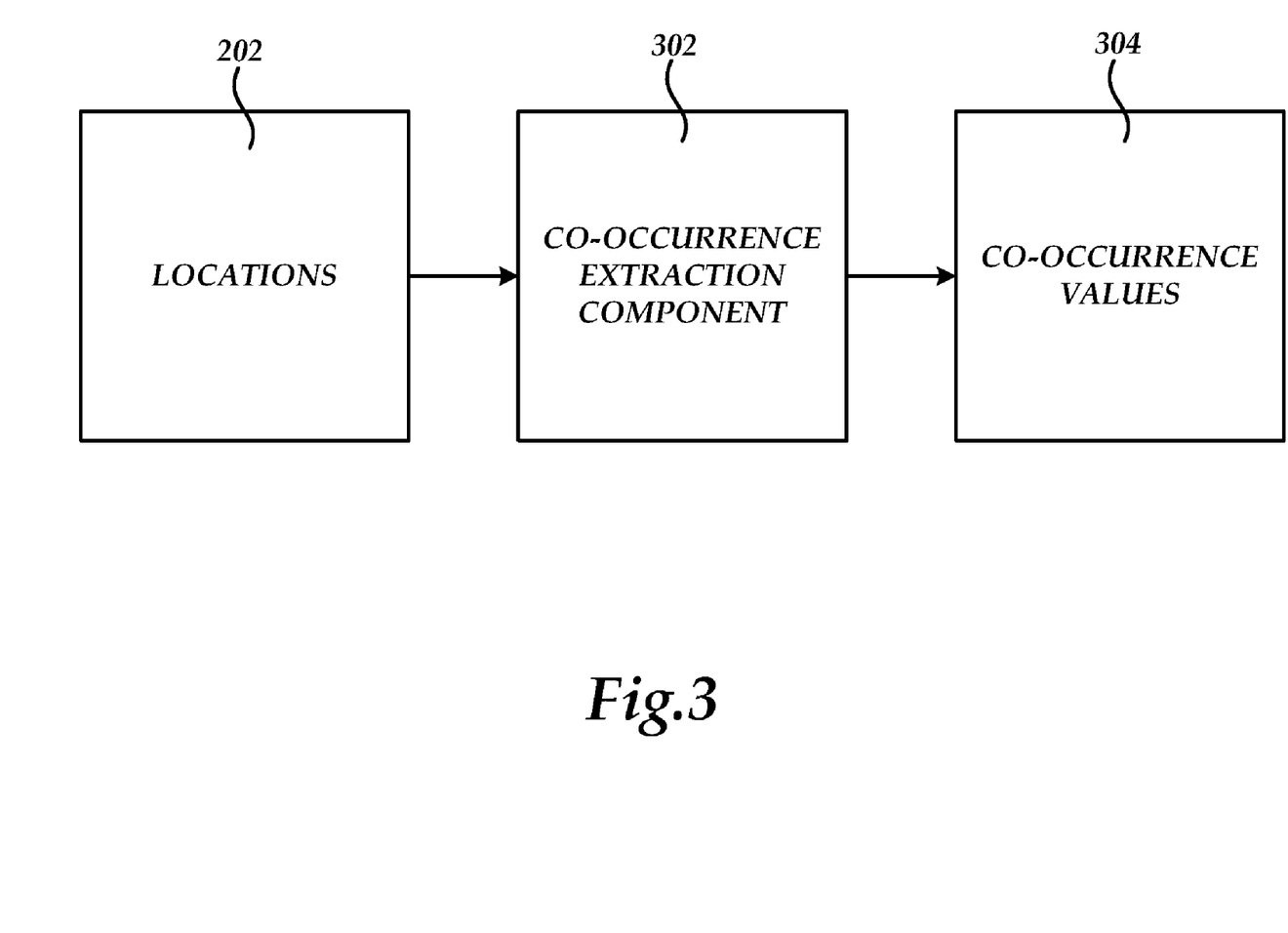
FIG. 3 is a software architecture diagram showing aspects of a software component utilized in one embodiment presented herein for generating co-occurrence values for locations identified in a set of travelogues.

Turning now to FIG. 2, a software architecture diagram showing aspects of one software component utilized in an embodiment presented herein for extracting locations from Web sites will be described. In particular, FIG. 3 illustrates a location extraction component 302 that might be executed by the server computer 104B according to various embodiments presented herein. The location extraction component 122 is an executable software component configured to take a Web page, such as the Web page 116, as input. The location extraction component 122 then analyzes the Web page 116 to identify the locations 202 mentioned therein. For instance, if the Web page 116 referred to New York City, Brooklyn, Manhattan, Wall Street, and Central Park, the location extraction component 122 would be able to identify these locations 202 through an analysis of the Web page 116.

In order to identify locations in a Web page 116, the location extraction component 122 might utilize a gazetteer that contains location names in order to identify the locations mentioned in the Web site 112. For instance, the gazetteer might be utilized to identify possible name candidates, a classifier might then be utilized to identify location names from the candidates, and ambiguity resolution might then be performed to distinguish between different locations that have the same name.

According to various embodiments, the location extraction component 302 might also be configured to take a set of travelogues as input. As discussed briefly above, travelogues are textual descriptions of a person's experience with a particular location and might also include a description of the person's experience with other, related locations. The location extraction component 302 analyzes the travelogues to identify all of the locations mentioned therein. As will be described in greater detail below, the locations identified in the set of travelogues can be utilized to identify other popular locations near the locations identified in a Web page 116. This process is described in greater detail below with respect to FIG. 3.

Turning now to FIG. 3, a software architecture diagram showing aspects of a software component utilized in one embodiment presented herein for generating co-occurrence values for locations identified in travelogues will be described. As discussed briefly above, the co-occurrence values are utilized in one embodiment presented herein to display information regarding other popular locations near those locations mentioned in a Web page 116.

In particular, FIG. 3 illustrates a co-occurrence extraction component 302. The co-occurrence extraction component 302 is also an executable software component that might be utilized by the server computer 104B to provide aspects of the functionality described herein. As illustrated in FIG. 3, the co-occurrence extraction component 302 takes the locations 202 generated by the location extraction component 122 following the analysis of a set of travelogues as input.

The co-occurrence extraction component 302 computes co-occurrence values for the identified locations 202. As discussed briefly above, a co-occurrence value is an integer value that specifies the number of times two locations are mentioned in the same travelogue over the entire set of travelogues. In order to compute the co-occurrence value, the number of times each pair of locations 202 occurs within the entire universe of travelogues is computed by the co-occurrence extraction component 302. The co-occurrence values 304 are then stored for use in providing information regarding popular locations near the locations identified in a Web page 116 in the manner described below.

Figure 4:
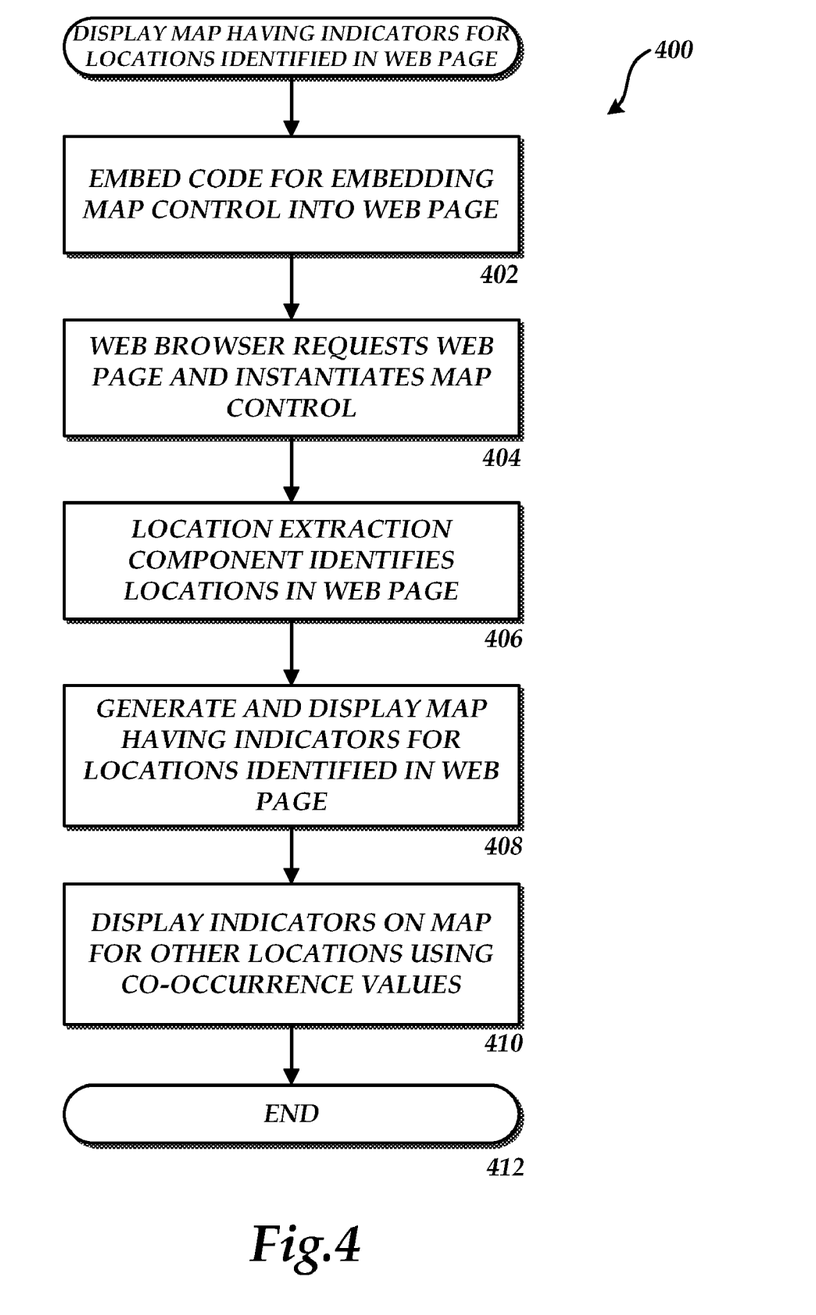
FIG. 4 is a flow diagram showing aspects of one process presented herein for travelogue-based contextual map generation according to one embodiment presented herein.

Referring now to FIG. 4, additional details will be provided regarding the embodiments presented herein for travelogue-based contextual map generation. In particular, FIG. 4 is a flow diagram showing a routine 400 that illustrates aspects of one process presented herein for generating a map that encompasses locations mentioned within a Web page 116.

It should be appreciated that the logical operations described herein with respect to FIG. 4 and the other FIGURES are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 400 begins at operation 402, where the code 118 is embedded in the Web page 116. As described above, the code 118 provides functionality for embedding the map control 120 into the Web page 116. As also discussed above, the code 118 may comprise script that can be embedded in-line with the markup of the Web page 116. An owner of the Web site 112 and the Web page 116 may place the code 118 into the Web page 116. Alternately, the program code 118 may be placed into the Web page 116 by another program. Once the program code 118 has been embedded in the Web page 116, the routine 400 proceeds to operation 404.

At operation 404, the Web browser 108 requests the Web page 116. In response thereto, the Web server application 110 provides the Web page 116 to the Web browser 108. The Web browser 108 renders the Web page 116, including the program code 118, which causes the map control 120 to be instantiated. As discussed briefly above, when instantiated the map control 120 provides a display in-line with the display of the Web page 116 that includes a map containing locations mentioned within the Web page 116.

In order to provide the above-described functionality for generating and displaying a map encompassing the locations mentioned within the Web page 116, the routine 400 proceeds to operation 406. At operation 406, the location extraction component 122 identifies locations mentioned within the Web page 116 in the manner described above with reference to FIG. 2. Once the locations mentioned within the Web page 116 have been identified, the routine 400 proceeds to operation 408. At operation 408, the map control 120 operates in conjunction with the map server application 114 to generate a map that encompasses the locations identified within the Web page 116. Additionally, the map is generated such that it includes visual indicators corresponding to the locations identified within the Web page 116. The map is then displayed by the map control 120 executing within the Web browser 108 in-line with the content of the Web page 116.

From operation 408, the routine 400 proceeds to operation 410, where the map control 120 also displays visual indicators on the map for other popular locations near the locations identified in the Web page 116. As described above, the co-occurrence values 304 generated by the co-occurrence extraction component 302 can be utilized to identify the other locations. Once the other locations have been displayed on the map, the routine 400 proceeds to operation 412, where it ends.

Figure 5A:
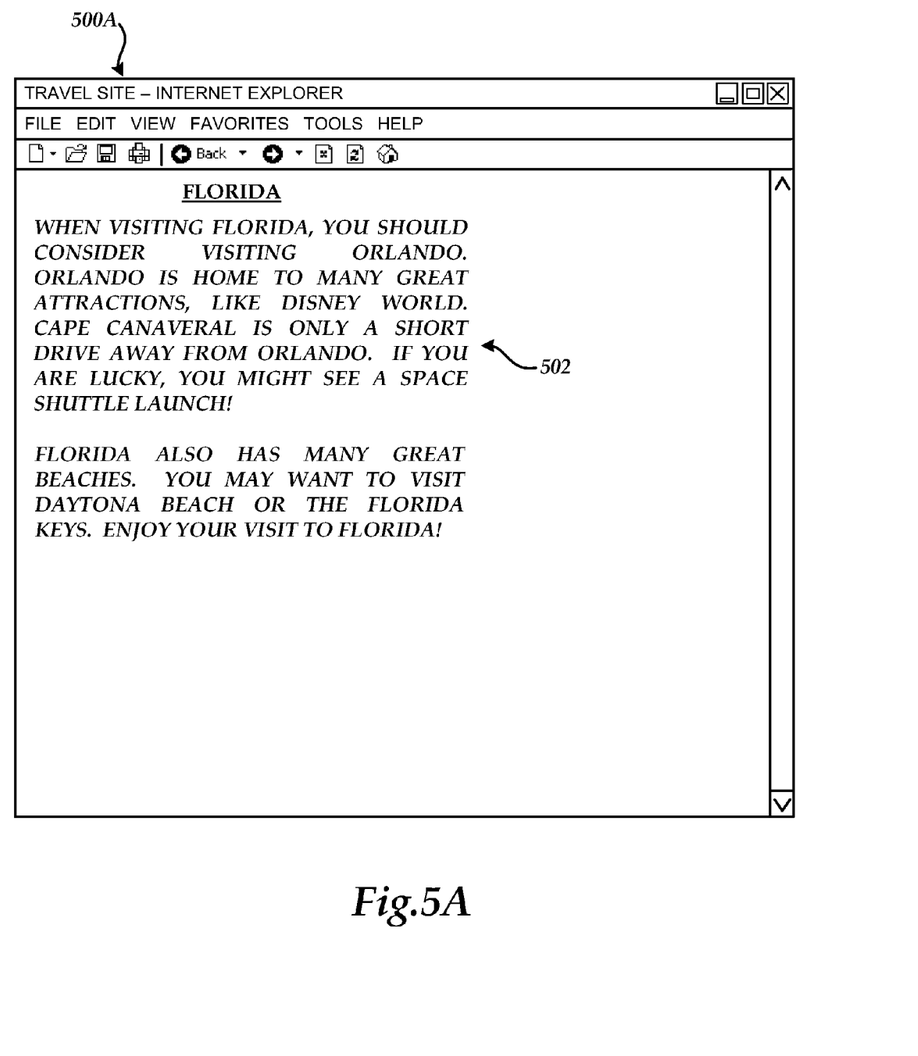
FIGS. 5A-5B are display diagrams showing aspects of a Web browser display showing a map and other user interface components generated by software components presented in various embodiments disclosed herein.
Figure 5B:
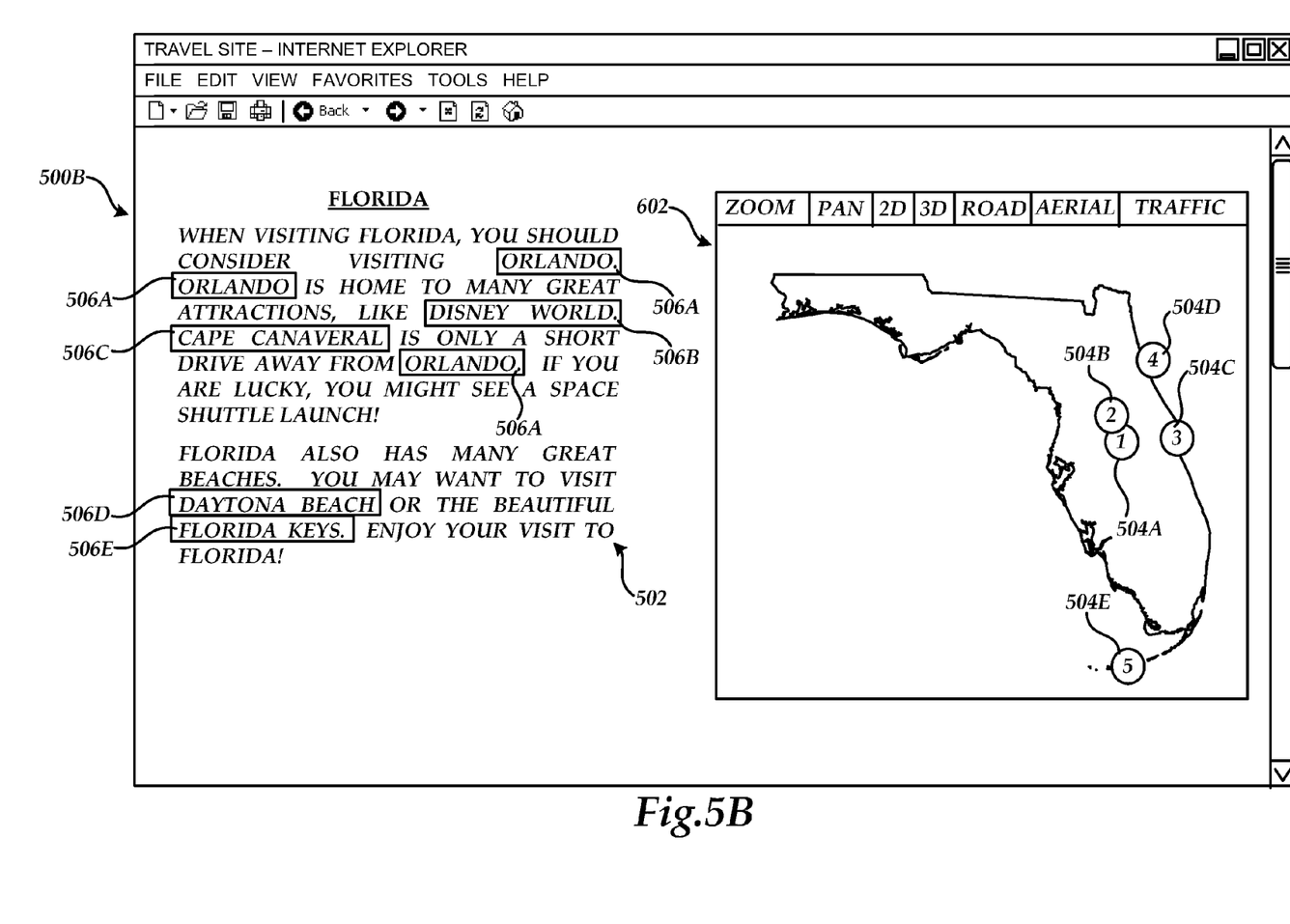

Turning now to FIGS. 5A-5B, several display diagrams showing aspects of a Web browser display including a map and other user interface components generated by software components presented in various embodiments disclosed herein will be described. In particular, FIG. 5A is a screen display 500A showing a window generated by the Web browser 108. The window generated by the Web browser 108 includes text 502 contained within the Web page 116 and represents a rendering of the Web page 116 without application of the concepts described above. In contrast, FIG. 5B shows a screen display 500B representing a window displayed by the Web browser 108 utilizing the concepts presented above.

In the screen display 500B shown in FIG. 5B, the map control 120 has generated and displayed a map 602 in conjunction with the text 520 of the Web page 116. As discussed above, the map 602 includes visual indicators 504A-504E corresponding to the locations identified within the text 502 of the Web page 116. According to other embodiments, other visual indicators might be displayed in the map 602 corresponding to other locations near the locations identified in the text 502.

According to other aspects, the locations identified in the text 502 might be emphasized in order to highlight the locations as compared to the remainder of the text 502. For instance, in the example screen display shown in FIG. 5B, emphasis 506A-506E has been applied to the names of the locations identified in the text 502. According to embodiments, the emphasis 506A-506E may comprise hyperlinks applied to the names of the locations which, when selected, will cause the Web browser 108 to display a search page including results for the selected location. Other types of emphasis may be applied to the names of the locations identified within the text 502.

According to other embodiments, the map 602 might include functionality for permitting a user to interact with the contents of the map. For instance, user interface controls may be provided which, when selected, allow a user to zoom into or pan around the map 602. Additionally, other views may be provided, including a two-dimensional view and a three-dimensional view. Other information may also be overlaid on the map 602, such as roads, traffic, and satellite imagery. Other similar functionality for interacting with the map 602 may also be provided in other embodiments.

Figure 6:
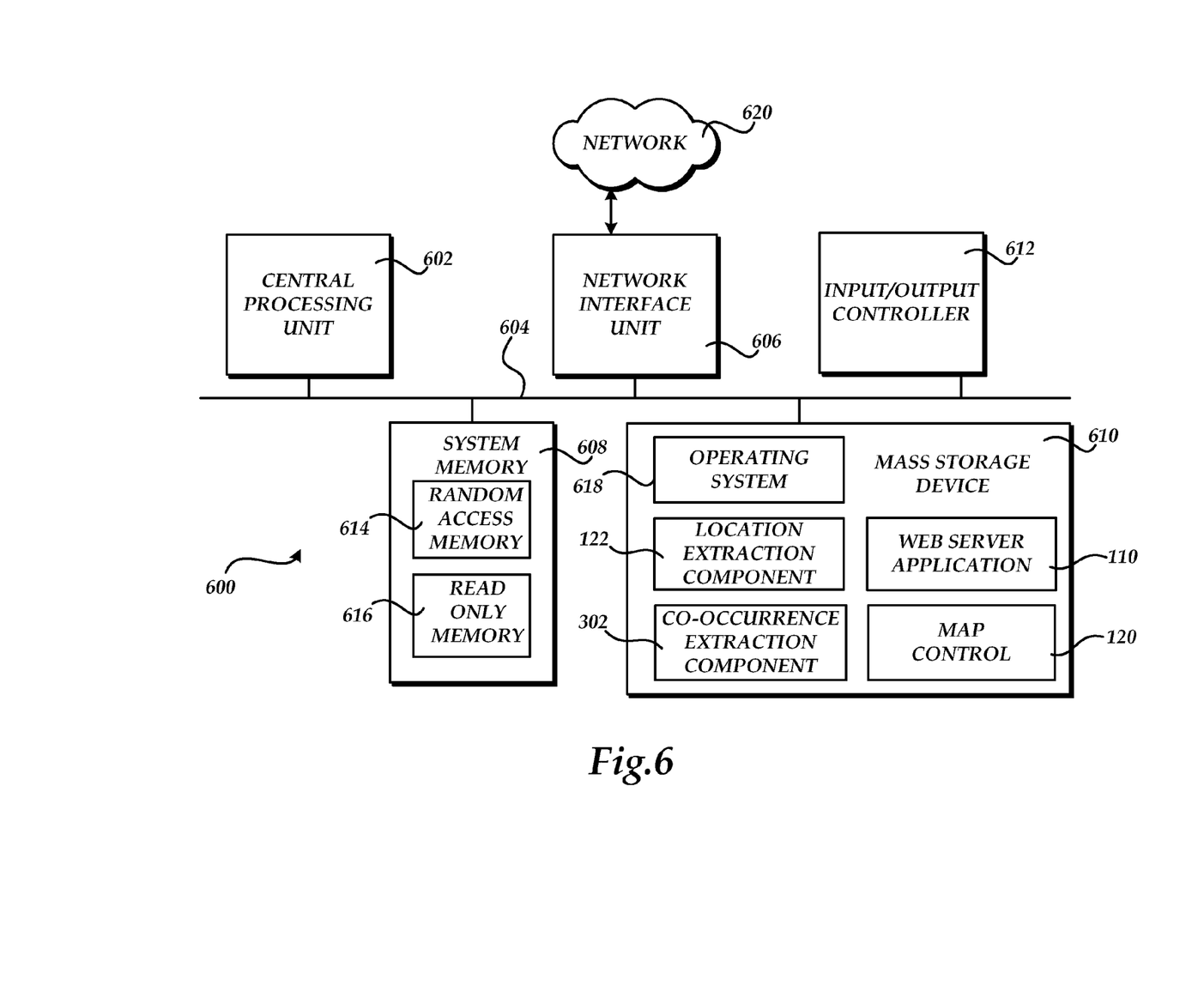
FIG. 6 is a computer architecture diagram showing an illustrative computer hardware and software architecture for a computing system capable of implementing aspects of the embodiments presented herein.

FIG. 6 shows an illustrative computer architecture for a computer 600 capable of executing the software components described herein for providing travelogue-based contextual map generation in the manner presented above. The computer architecture shown in FIG. 6 illustrates a conventional desktop, laptop, or server computer and may be utilized to execute any aspects of the software components presented herein. For instance, the computer architecture shown in FIG. 6 might be utilized to implement the client computer 102 or the server computers 104A-104B.

The computer architecture shown in FIG. 6 includes a central processing unit 602 ("CPU"), a system memory 608, including a random access memory 614 ("RAM") and a read-only memory ("ROM") 616, and a system bus 604 that couples the memory to the CPU 602. A basic input/output system containing the basic routines that help to transfer information between elements within the computer 600, such as during startup, is stored in the ROM 616. The computer 600 further includes a mass storage device 610 for storing an operating system 618, application programs, and other program modules, which are described in greater detail herein.

The mass storage device 610 is connected to the CPU 602 through a mass storage controller (not shown) connected to the bus 604. The mass storage device 610 and its associated computer-readable media provide non-volatile storage for the computer 600. Although the description of computer-readable media contained herein refers to a mass storage device, such as a hard disk or CD-ROM drive, it should be appreciated by those skilled in the art that computer-readable media can be any available computer storage media that can be accessed by the computer 600.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 600.

According to various embodiments, the computer 600 may operate in a networked environment using logical connections to remote computers through a network such as the network 620. The computer 600 may connect to the network 620 through a network interface unit 606 connected to the bus 604. It should be appreciated that the network interface unit 606 may also be utilized to connect to other types of networks and remote computer systems. The computer 600 may also include an input/output controller 612 for receiving and processing input from a number of other devices, including a keyboard, mouse, or electronic stylus (not shown in FIG. 6). Similarly, an input/output controller may provide output to a display screen, a printer, or other type of output device (also not shown in FIG. 6).

As mentioned briefly above, a number of program modules and data files may be stored in the mass storage device 610 and RAM 614 of the computer 600, including an operating system 618 suitable for controlling the operation of a networked desktop, laptop, or server computer. The mass storage device 610 and RAM 614 may also store one or more program modules. In particular, the mass storage device 610 and the RAM 614 may store the location extraction component 122, the co-occurrence extraction component 302, the Web server application 110, and the map control 120, each of which was described in detail above with respect to FIGS. 1-5. The mass storage device 610 and the RAM 614 may also store other types of program modules and data, including travelogues, the locations 202, and the co-occurrence values 304.

It should be appreciated that the software components described herein may, when loaded into the CPU 602 and executed, transform the CPU 602 and the overall computer 600 from a general-purpose computing system into a special-purpose computing system customized to facilitate the functionality presented herein. The CPU 602 may be constructed from any number of transistors or other discrete circuit elements, which may individually or collectively assume any number of states. More specifically, the CPU 602 may operate as a finite-state machine, in response to executable instructions contained within the software modules disclosed herein. These computer-executable instructions may transform the CPU 602 by specifying how the CPU 602 transitions between states, thereby transforming the transistors or other discrete hardware elements constituting the CPU 602.

Encoding the software modules presented herein may also transform the physical structure of the computer-readable media presented herein. The specific transformation of physical structure may depend on various factors, in different implementations of this description. Examples of such factors may include, but are not limited to: the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software may also transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 600 in order to store and execute the software components presented herein. It also should be appreciated that the computer 600 may comprise other types of computing devices, including hand-held computers, embedded computer systems, personal digital assistants, and other types of computing devices known to those skilled in the art. It is also contemplated that the computer 600 may not include all of the components shown in FIG. 6, may include other components that are not explicitly shown in FIG. 6, or may utilize an architecture completely different than that shown in FIG. 6.

Based on the foregoing, it should be appreciated that technologies for travelogue-based contextual map generation are provided herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for travelogue-based contextual map generation, the computer-implemented method comprising performing computer-implemented operations for:
    identifying, by a computing device, one or more locations mentioned in a Web page travelogue for a particular location;
    causing a map to be generated and displayed, by the computing device, in conjunction with a display of the Web page travelogue, the map encompassing the identified locations;
    generating, by the computing device, co-occurrence values for the one or more locations by identifying a number of times a pair of first and second locations are mentioned within a universe of travelogues associated with the particular location;
    identifying, by the computing device, at least one other location based on the co-occurrence values; and
    causing the map, by the computing device, to encompass the at least one other location.

2. The computer-implemented method of claim 1, wherein the map further comprises visual indicators corresponding to one or more of the identified locations.

3. The computer-implemented method of claim 1, further comprising causing visual indicators to be displayed, by the computing device, on the map for the one or more other locations identified using the co-occurrence values.

4. The computer-implemented method of claim 1, wherein the Web page travelogue comprises program code for causing a map control to be executed when the Web page travelogue is rendered by a Web browser, the map control configured to display the map in conjunction with the display of the Web page travelogue.

5. The computer-implemented method of claim 1, wherein identifying one or more locations in the Web page travelogue comprises executing, by the computing device, a location extraction component configured to identify the one or more locations in the Web page travelogue.

6. The computer-implemented method of claim 1, wherein generating co-occurrence values for the locations comprises executing, by the computing device, a co-occurrence extraction component configured to generate the co-occurrence values utilizing the one or more identified locations.

7. The computer-implemented method of claim 1, wherein the Web page travelogue further comprises text, the text including the names of the locations, the Web page travelogue including a person's written experience with the particular location.

8. The computer-implemented method of claim 7, wherein the map is displayed in conjunction with the text.

9. A computer-readable storage medium having computer-readable instructions stored thereupon which, when executed by a computer, cause the computer to:
    execute a location extraction component configured to identify one or more locations in a Web page travelogue for a particular location;
    execute a co-occurrence extraction component to generate co-occurrence values related to a frequency of pairs of first and second locations mentioned within a plurality of travelogues associated with the particular location;
    identifying at least one other location based on the co-occurrence values;
    generate a map encompassing the identified locations and the at least one other location; and
    to cause the map to be displayed in conjunction with a display of the Web page travelogue.

10. The computer-readable storage medium of claim 9, wherein the map further comprises visual indicators corresponding to one or more of the identified locations.

11. The computer-readable storage medium of claim 9, having further computer-executable instructions stored thereupon which, when executed by the computer, will cause the computer to cause visual indicators to be displayed on the map for the other locations identified using the co-occurrence values.

12. The computer-readable storage medium of claim 9, wherein the Web page travelogue comprises program code for causing a map control to be executed when the Web page travelogue is rendered by a Web browser, the map control configured to display the map in conjunction with the display of the Web page travelogue.

13. The computer-readable storage medium of claim 9, wherein the Web page travelogue further comprises text, the text including the names of the locations, the Web page travelogue including a person's written experience with the particular location.

14. The computer-readable storage medium of claim 13, wherein the map is displayed in conjunction with the text.

15. A computer-readable storage medium having computer-readable instructions stored thereupon, the computer-readable instructions being executable by a computer, and comprising:
    a location extraction component configured to identify one or more locations in a Web page travelogue for a particular location, the one or more locations including other locations different than the particular location, the other locations being included based on a frequency of occurrence the other locations are mentioned within a plurality of travelogues associated with the particular location;
    a map control configured to display a map encompassing the identified locations and including visual indicators corresponding to one or more of the identified locations; and
    a Web page travelogue comprising program code for causing the map control to be executed when the Web page travelogue is rendered by a Web browser.

16. The computer-readable storage medium of claim 15 having further computer-executable instructions stored thereupon comprising a co-occurrence extraction component configured to generate co-occurrence values for the one or more locations and to identify other locations using the co-occurrence values, and wherein the map control is further configured to display indicators on the map for the other locations identified using the co-occurrence values.

17. The computer-readable storage medium of claim 15, wherein the Web page travelogue further comprises text, the text including the names of the locations, the Web page travelogue including a person's written experience with the particular location.

18. The computer-readable storage medium of claim 16, wherein the co-occurrence values comprise integer values specifying the number of times a first location and a second location are mentioned within a same travelogue for travelogues within a set of travelogues associated with the particular location.

* * * * *